July 9, 1935.  E. W. MADGE ET AL  2,007,578
MANUFACTURE OF RUBBER
Filed Feb. 21, 1934
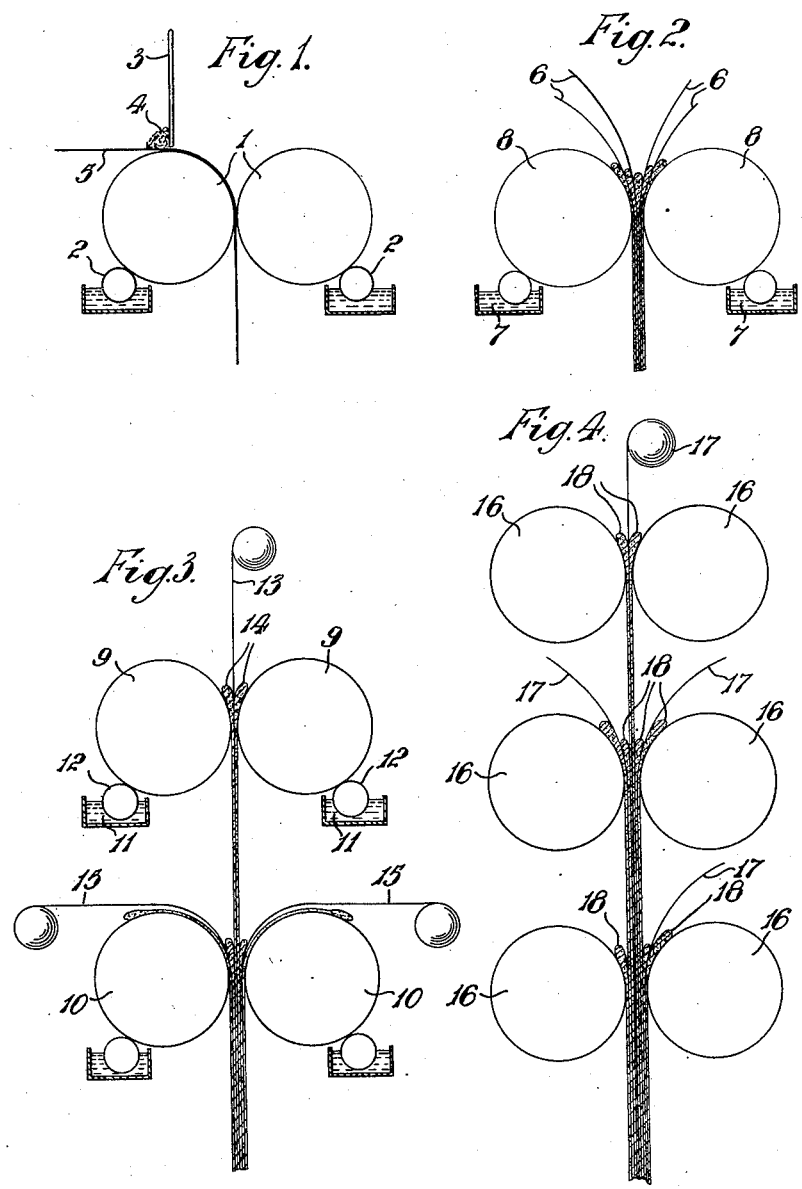

Patented July 9, 1935

2,007,578

UNITED STATES PATENT OFFICE 2,007,578

MANUFACTURE OF RUBBER

Evelyn William Madge, Wylde Green, Birmingham, and Francis James Payne, Erdington, Birmingham, England, assignors to Dunlop Rubber Company Limited, London, England, a British company Application February 21, 1934, Serial No. 712,358
In Great Britain March 9, 1933

9 Claims. (Cl. 154—40)

This invention comprises improvements in or relating to the manufacture of rubber materials, that is, materials of, or provided with, compositions of or containing rubber.

The object of the present invention is to provide an improved method for producing rubber materials directly from aqueous dispersions of the kinds hereinafter specified.

We are aware that various proposals have been made for the production from rubber latex of such materials as, for instance, rubber sheeting, rubber strips, rubber coated fabrics as, for example, waterproofed fabrics, impregnated weftless cord fabrics, substitutes for cork, leather, lineoleum, comprising cellulose used in the form of a loose fleece and rubber and rubber backed carpets.

Another object of the present invention is to provide a method for the continuous production of materials of the aforesaid kinds in a quicker and more efficient manner than has heretofore been possible.

The method of the present invention for the continuous production of materials of, or containing, rubber comprises introducing aqueous dispersions of the kinds hereinafter specified into one or more nips formed by two or more suitably positioned moving surfaces, effecting coagulation of the aqueous dispersions aforesaid in such manner that coagulation proceeds at and from one or more of the moving surfaces forming the nips or receptacles and withdrawing the formed material through the one or more nips or receptacles.

Alternatively, the amount of aqueous dispersion aforesaid to be introduced into the one or more nips or receptacles can be so predetermined that only the nip or nips are continuously provided with dispersion, and under these conditions, if desired, continuous total coagulation may be effected of the whole of the dispersion in the nip or nips.

The one or more nips or receptacles can, for example, be formed by positioning two or more rotating rollers, or by positioning two endless belts, or one endless belt and one roller, or by positioning two or more moving lengths of fabric, or by introducing two or more moving lengths of fabric positioned at the desired angles to each other through two rotating rollers, or by introducing a moving length of fabric between two rotating rollers.

In the production of materials of the aforesaid, kinds working in accordance with one embodiment of the present invention, rotating rollers can be employed provided with a coagulant for the aqueous dispersions aforesaid.

In accordance with another embodiment of the invention, the coagulant can be dispensed with and, alternatively, aqueous dispersions can be employed which are sufficiently sensitive to coagulate in their passage through the nip.

As a still further embodiment of the present invention, aqueous dispersions of the kinds hereinafter specified can be employed which are, or which have been, rendered capable of gelling or coagulating upon the application of heat, and introducing these heat-sensitive dispersions into one or more nips or receptacles formed by two or more suitably positioned, heated moving or rotating surfaces, such as heated rollers. If desired, two or more embodiments of the present invention can be used in combination.

Where coagulant treated rollers are employed these most suitably take the form of rubber covered rollers, the rubber covering being of a hard nature, and preventing corrosion due to any attack by the coagulant. The rollers are geared together and may be hand or motor driven. The treating with coagulant may be achieved, for example, by the use of felt wicks soaked in coagulant, or by felt covered rollers rotating in coagulant baths and in contact with the processing rollers.

Any suitable known coagulant may be employed, for example, aqueous acetic acid solutions, coagulating solutions of salts, e. g., of magnesium sulphate. Volatile coagulants may also be employed.

In, for instance, the production of rubber sheet direct from rubber latex a rubber latex mixing in a pasty condition, of 68% total solids and rubber latex mixing of the following composition:—

| | Parts by weight |
|---|---|
| Rubber | 90 |
| Potassium hydroxide | 0.8 |
| Sulphur | 2 |
| Zinc oxide | 2 |
| Lamp black | 5 |
| Zinc diethyldithiocarbamate | 1 | is fed into the nip of two coagulant treated, rotating, horizontally positioned, rollers and rubber sheet is withdrawn continuously beneath them. The rubber sheet produced in this manner may be carried away on a water trough for handling purposes and subsequently dried and chalked.

The gauge of the sheet is conditioned by the distance between the rollers and the strength of the coagulant employed. The issuing sheet is found to be very uniform.

It has been found that by using coagulant treated rollers or hot calender rolls with destabilized latex mixing, thick sheets can be produced, whereas by using latex mixings sensitive to shear only thin sheets are produced, as in this case it is necessary to have the rollers very tight in order to coagulate the latex.

In rubber latex spreading processes where heat alone is used for drying and coagulating, a number of coats are necessary even to build up a thin sheet, and where thick rubber sheet is required, as for instance for golf ball tape and thread, a much greater number of coats are required, whereas with the present invention it is possible to produce even thick rubber sheet in one operation.

In accordance with the present invention a latex mixing can be pressed and sheared between two moving or rotating surfaces continually wiped or licked with coagulant; a shear-sensitive latex mixing can be pressed and sheared between two moving or rotating surfaces which have not been provided with a coagulant; a heat-sensitive latex mixing i. e. capable of coagulating or gelling upon the application of heat can be pressed and sheared between two heated moving or rotating surfaces which may or may not be continually licked or wiped with coagulant.

If desired, heat may be employed to assist coagulation of a latex mixing spread on a moving or rotating surface which has been treated or licked continually with coagulant; also, if desired, pressure and shear may be used to assist the continuous coagulation of a heat-sensitive mixing passed between two heated moving or rotating surfaces.

In the production of materials comprising fibres and rubber, for instance, two cotton webs such as webs of carded cotton can be continuously fed into the nip formed by two coagulant licked rotating horizontally positioned rollers, maintaining a bank of pasty latex mixing between the two nips. The process is more or less automatic in action, the formed material issuing continuously. If desired the material may be simultaneously surfaced by using auxiliary banks of mixing between the outer surfaces of the webs and their respective rollers.

Alternatively satisfactory treated web material may be made by feeding a heavy web between the coagulant licked rollers, a bank of mixing being maintained between one or both sides of the web and the rollers.

Penetration of the latex mixing to the outer surfaces takes place as the webs pass between the nips, in the case where latex is introduced between two webs or from the exterior to the interior where one heavy web is used with exterior banks.

In addition to carded webs of cotton, carded webs of wool and the like materials can also, if desired, be treated in the herein described manner. Furthermore, if desired, instead of carded webs, felts can be impregnated and surfaced in a similar manner to the rubberizing of carded webs.

Even and smooth proofings on a variety of woven fabrics can be produced working in accordance with the present invention. For example, fabric is passed between the nip of two coagulant licked rotating rollers and a bank of latex mixing is merely employed on one side of the fabric. The weight of rubber deposited on the fabric is governed by the gap between the rollers and the strength of the coagulant used for licking them. The use of a coagulant on the roller on the side to which latex has not been introduced counteracts the tendency for latex to strike through the fabric.

Double textured waterproofed material can be produced in a single operation by calendering a latex mixing between two sheets of the material to be waterproofed, the rollers of the calender being continually licked with a coagulant.

For the production of belting a latex mixing can be introduced between the nips or receptacles formed by a number of plies of fabric and the two coagulant licked rotating rollers. The belting is surfaced at the same time as the plies are being bonded by the rubber.

Cheap flooring material can be produced by building up a large number of plies of cheap open hessian by introducing a latex mixing into the receptacles formed by the plies of hessian and passing the hessian through coagulant licked rotating rollers. If open asbestos cloth is used instead of open hessian and the asbestos cloth is treated with an ebonite mixing, material can be produced which may be used for brake linings.

Carpets can be backed in accordance with the present invention in a continuous manner. The carpet material is passed between coagulant licked rotating rollers and a latex mixing is applied to one side of the carpet and as coagulation proceeds from the side of the rubber removed from the carpet, locking of the pile of the carpet can be obtained at the same time.

It is also possible to carry out the continuous rubbering of weftless cord by passing such material from a suitable creel through the nip of two coagulant licked rollers a bank of latex mixing being maintained in the nip.

The emulsions or dispersions of rubber or the like comprise those consisting of rubber, gutta-percha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding and vulcanizing ingredients and/or may be in the first instance in concentrated form.

Concentrates such as are obtained in Patent No. 1,846,164 or British Patent No. 219,635, to which may be added any one or more of the usual known compounding ingredients may also be employed.

If desired, the aqueous dispersions employed are or have been made capable of gelling on the application of heat. Examples of substances which can be used for making the aforesaid dispersions capable of gelling on the application of heat are sodium or potassium silico-fluoride, ammonium persulphate or reagents which by chemical interaction with one another upon the application of heat produce one or more substances in situ which function as active coagulating agents for example a mixture of zinc oxide and ammonium sulphate.

If desired, one or more of the moving or rotating surfaces such as rotating rollers may be patterned, thereby giving a patterned or embossed surface or perforated material. Furthermore, the material produced according to the present invention can be subsequently given, for instance in known manner, a suede surface finish by spraying the material, for example, with waste wool.

If desired, a number of the materials produced according to the invention may be embossed, cellulose finished or otherwise treated in any of the ways normal to the finishing of artificial leather material.

The following examples illustrate how the method of the present invention can be carried into effect, reference being made to the accompanying drawing, in which—

Fig. 1 is a diagrammatic sketch of the apparatus for rubberizing a fabric such as weftless cord fabric with coatings of low weight; Fig. 2 is a diagrammatic sketch of apparatus for producing three or four ply belting with thin films of rubber; Fig. 3 is a diagrammatic sketch of an apparatus for producing multi-ply belts having films of greater and predetermined thickness by treatment in successive stages, and Fig. 4 is a diagrammatic sketch of a modified apparatus for producing multi-ply fabrics.

*Example 1*

The following procedure can be adopted for proofing and for rubberizing weftless cord particularly where coatings of very low weight are to be obtained and when mixings of low rubber content are to be employed. In such cases, it is desirable to make use of a spreading gauge in conjunction with coagulant licked rollers. This procedure can be carried out as diagrammatically illustrated in Fig. 1, where 1 are two rotating rollers licked by a coagulant by licking rollers 2, 3 is a spreading gauge, 4 is a latex mixing and 5 is the fabric to be proofed. In this arrangement, advantage is taken of the spreading gauge to give the fine coating and of the coagulant licked rollers which permit the easy processing. This arrangement is of particular value in connection with the rubberizing of weftless cord as immediate coagulation is usually necessary for the actual binding of the cords.

*Example 2*

The following procedure can be adopted for the continuous production of reinforced, porous or micro-porous articles of rubber or the like having a high resistance to tear wherein a web or webs composed of interlocked fibres are treated with rubber latex, the latex coagulated or gelled and thereafter the coagulated or gelled rubber vulcanized in known manner under such conditions that evaporation of the liquid contained therein is prevented.

One or more plies of carded cotton web are fed between coagulant licked rollers and impregnated with a bank of abonite mixing maintained, respectively, between either the web and the rollers or between the webs themselves. The treated sheet is either stored before vulcanization in dilute acetic acid or in water. Preferably the sheet is stored in the latter after a first immersion in the former. The rubber is subsequently vulcanized in known manner to prevent the escape of water.

A suitable latex mixing is one of 68% concentration and of the following composition—

| | Parts by weight |
|---|---|
| Rubber | 100 |
| Sulphur | 40 |
| Mineral oil | 10 |
| Clay | 5 |
| Potassium hydroxide | 1 |

It is possible to obtain a product of quite a high porosity using a high concentration mixing, because the cotton fibre appears to help to resist the forces of contraction.

If the coagulant licked rollers are grooved or patterned the material may then be caused to bear suitable patterns, ribs, grooves, or perforations.

It is to be understood that working in a somewhat similar manner but omitting the introduction of one or more plies of carded cotton web between the coagulant licked rollers ordinary non-reinforced microporous rubber can be produced.

*Example 3*

The production of belting having thick inner layers of rubber, for maximum adhesive strength, will now be described with reference to the accompanying diagrammatic drawing illustrated in Figs. 2 and 3. Fig. 2 illustrates an arrangement that may be used for the production of 3 or 4 ply belting where only thin films of rubber are used between the plies. In this arrangement, the coagulant 7 e. g., 10% acetic acid solution applied to the rollers 8, is only active in so far as the surface banks of latex are concerned. Coagulation between the plies is dependent on dehydration by the duck 6. If the inner layers of rubber are thin this is quite satisfactory. It is desirable, however, that belting should have an optimum thickness for the inner rubber layers so as to obtain maximum adhesion strength. In such cases, dehydration by the duck is insufficient to cause coagulation and the belt leaves the rollers having uncoagulated layers of rubber latex and is thus not handleable. Moreover, the arrangement according to Fig. 2 does not allow a definite thickness of rubber in the inner layers to be determined. These difficulties are overcome when working according to the arrangement diagrammatically illustrated in Fig. 3.

In this arrangement, the manufacture of the belt takes place in a number of stages, use being made of a plurality of rollers. Although the passage of the duck through these rollers is successive, the process is continuous. The rollers 9 and 10 are preferably geared together so that the process can be thought of as consisting of one operation only.

In this process, coagulant, e. g., 25% acetic acid solution contained in 11 and applied by licking rollers 12 to the rollers 9, still remaining on the outside of the rubber layer derived from the bank of latex mixing 14 on the first piece of duck 13 serves to coagulate the inner layers of latex between this piece of duck and the next two plies 15.

The three ply belt that issues beneath the second pair of rollers 10, licked for example with a 10% acetic acid solution has in this manner its layers of latex coagulated throughout and is then capable of being immediately handled. Moreover, the amount of rubber in the inner layers between the plies is exactly determinable as it depends on the strength of the coagulant used on the first pair of licking rollers 12, the distance between the pairs of rollers 9 and 10, respectively, and the thickness and concentration of the mixing employed. All these factors are controllable.

A method of the type just described may be extended for a belt of any number of plies merely by increasing the number of rollers available making sure that at each step the coagulant remaining on the outside of the coagulated rubber on the duck serves to coagulate the inner rubber layer for the next ply and so on. For example, in making a 4 ply belt, three pairs of coagulant licked rollers 16 are needed as shown in Fig. 4. In Fig. 4, 17 refers to pieces of duck and 18 to banks of latex mixing.

Having now particularly described our said invention, we claim—

1. A method for the continuous production of materials of the type described which comprises introducing aqueous dispersions of rubber material into a nip between moving surfaces, effecting coagulation of the aqueous dispersions in said nip, and withdrawing the formed material through the nip.

2. A method as claimed in claim 1, wherein the amount of aqueous dispersion aforesaid introduced into the nip is so predetermined that only the nip is continuously provided with dispersion.

3. A method as claimed in claim 1, wherein the amount of aqueous dispersion aforesaid introduced into the nip is so predetermined that only the nip is continuously provided with dispersion and wherein continuous total coagulation is effected of the whole of the dispersion in the nip.

4. A method as claimed in claim 1, wherein a plurality of moving lengths of fabric positioned at the desired angles to each other is passed through said nip with said dispersion.

5. A method as claimed in claim 1, wherein a moving length of fabric is passed through said nip with said dispersion.

6. A method as claimed in claim 1, wherein the moving surfaces forming said nip are provided with a coagulant for the aqueous dispersions aforesaid.

7. A method as claimed in claim 1, wherein aqueous dispersions are employed which are sufficiently sensitive to coagulate in their passage through the nip.

8. A method as claimed in claim 1, wherein aqueous dispersions are employed which gel upon the application of heat and wherein the moving or rotating surfaces are heated.

9. A method for the continuous production of materials of the type described which comprises forming a plurality of nips between moving surfaces, introducing aqueous dispersions of rubber material into said nips and effecting coagulation of said aqueous dispersions in said nips by contact with said moving surfaces and withdrawing the formed material through the nip.

EVELYN WILLIAM MADGE.
FRANCIS JAMES PAYNE.